Aug. 24, 1926.
A. J. OTTO
1,597,354
SELECTIVE CONTROL THERMOSTAT SYSTEM
Filed April 26, 1926    2 Sheets-Sheet 2
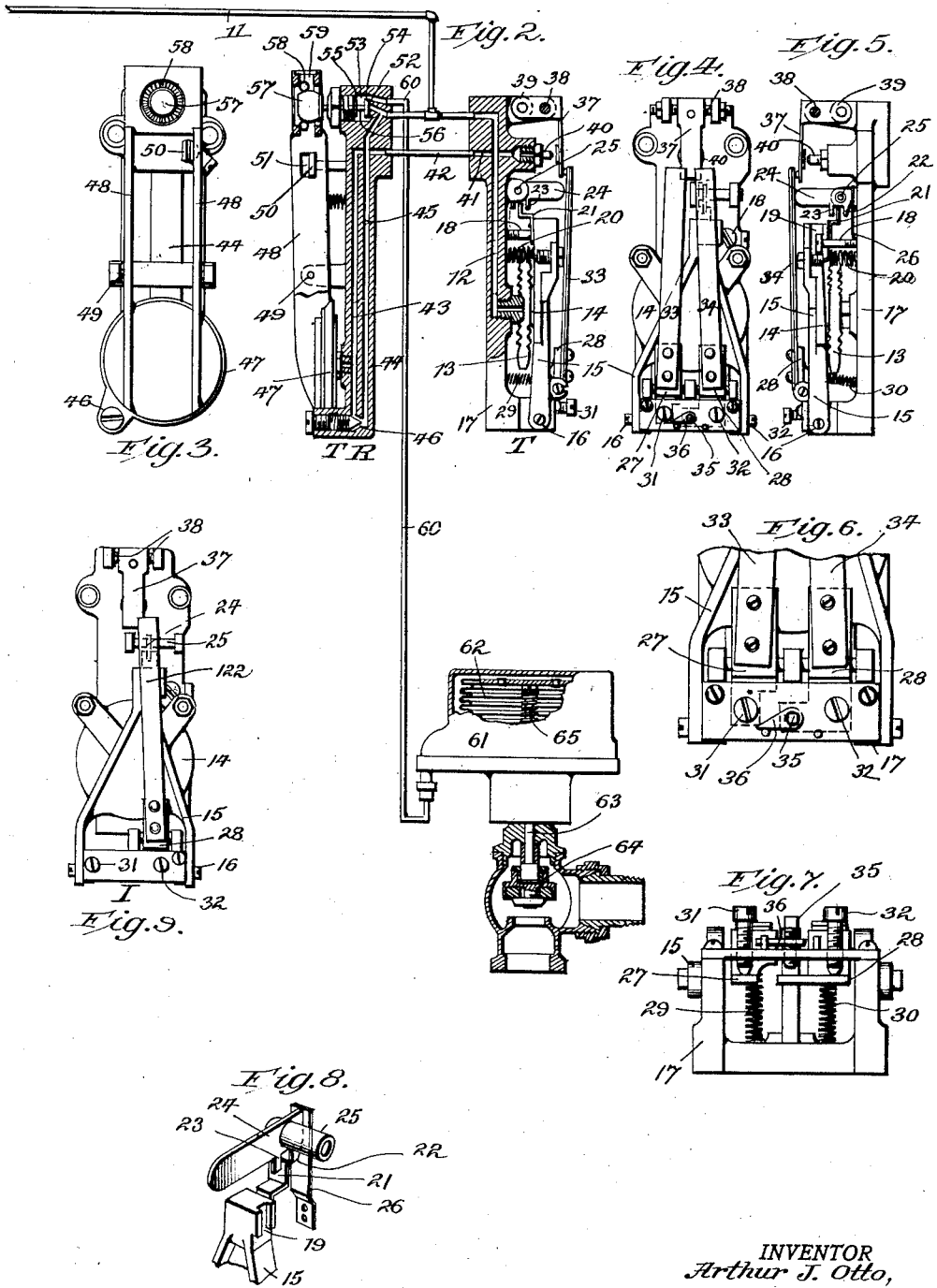
INVENTOR
Arthur J. Otto,
BY
ATTORNEYS Patented Aug. 24, 1926.

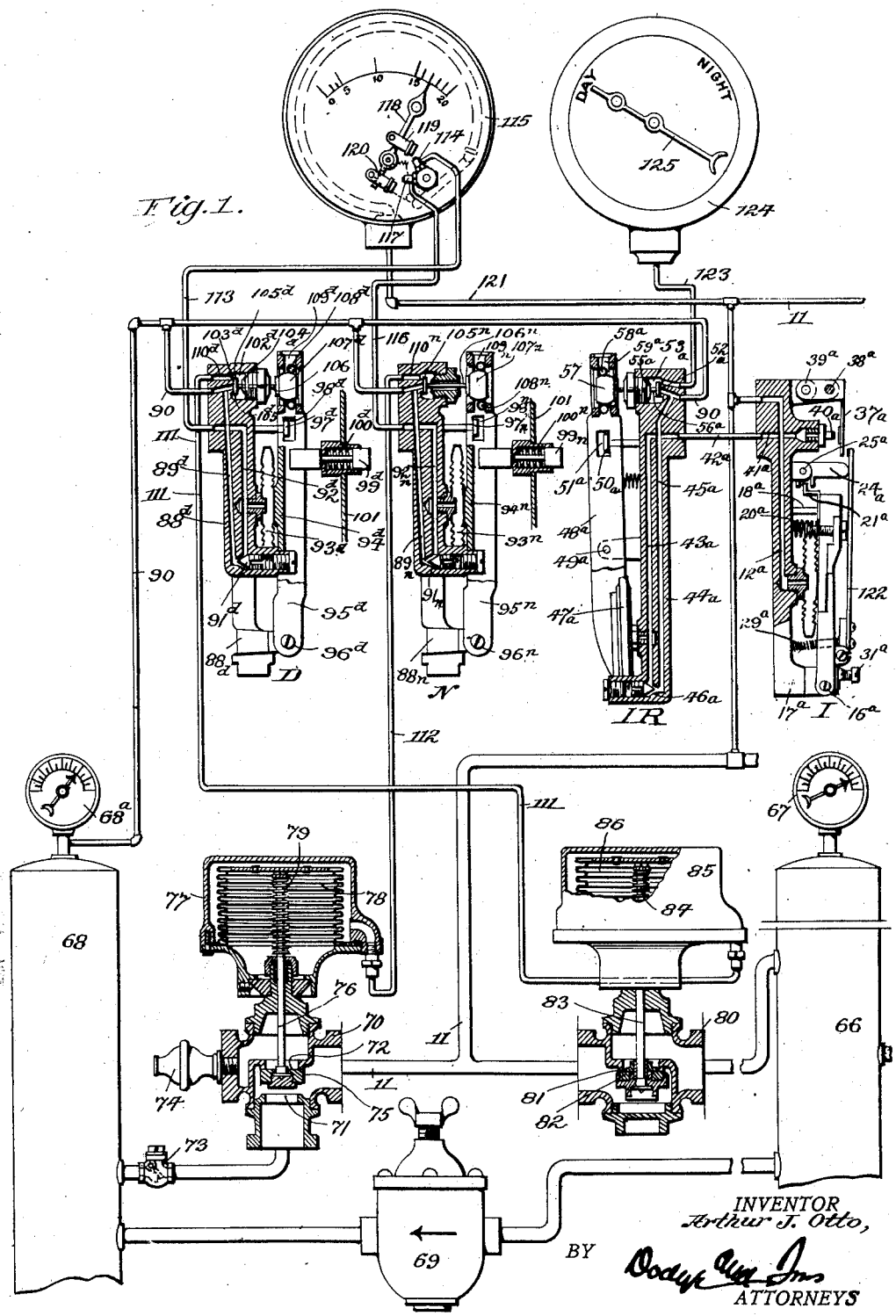

1,597,354

UNITED STATES PATENT OFFICE.

ARTHUR J. OTTO, OF MILWAUKEE, WISCONSIN, ASSIGNOR TO JOHNSON SERVICE COMPANY, OF MILWAUKEE, WISCONSIN, A CORPORATION OF WISCONSIN.

SELECTIVE-CONTROL THERMOSTAT SYSTEM.

Application filed April 26, 1926. Serial No. 104,767.

This invention relates to temperature regulation, and particularly to thermostat systems of the selective control type. Such systems are used chiefly in large public buildings, such, for example, as school buildings, where the entire building is occupied throughout the day and a portion of the building is occupied at night. It is the common practice to maintain in such buildings a higher temperature during the periods of occupancy and a selective control permits this idea to be extended, so that at night certain selected rooms will be heated to the day temperature, while the other rooms will be heated to the night temperature simultaneously. This action has been secured in a number of ways.

One prior method of changing the adjustment of room thermostats from night to day and back again to night was applicable to thermostats of the pneumatic type and involved an adjusting mechanism which was advanced step by step by means of pressure waves or surges in the air supply line.

One difficulty with such systems is that if any instrument gets out of step through failure to operate, it may remain out of step so that its adjustments will be made in the opposite sense or phase from that desired.

The object of the present invention is to produce a pneumatic thermostat capable of selective adjustment by pressure surges in the supply line, but so contrived that if an instrument should get out of step with the others in one adjusting actuation of the system, it will be brought back into step in the next adjusting actuation.

This result is accomplished by using two characteristically different pressure waves to produce the two opposite adjusting functions, and so contriving the different thermostats that they are capable of a selective response according to the character of the pressure wave. The simplest way to secure this result is to perform one characteristic adjustment by a wave of increased pressure and the other by a wave of reduced pressure.

A system operating according to the above description is illustrated in the accompanying drawings, in which the various mechanisms are shown somewhat in diagram. All the working parts are shown, but the air passages are drawn as if they all lay in the same plane, in order to make all these passages simultaneously visible. No attempt is made to illustrate the pipe connections in detail, nor to show the details of casings or supports. Such details are not features of the invention, and will conform to current practice.

Figure 1 shows a controlling and indicating mechanism ordinarily placed in the engine room.

Figure 2 shows the thermostat, the relay, and the radiator valve used in one room installation.

Figure 3 is a front elevation of the relay.

Figure 4 is a front elevation of the thermostat instrument, which is the right hand instrument of Figure 2.

Figure 5 is a right side elevation of the thermostate instrument, i. e., looking from the right relatively to Figure 4.

Figure 6 is a view identical with the lower portion of Figure 4, on an enlarged scale.

Figure 7 is a view looking upward at the lower end of the instrument of Figure 6.

Figure 8 is a perspective view showing the device for adjusting the thermostat to maintain night and day temperatures respectively.

Figure 9 is a front elevation of the indicating instrument shown at the right hand in Figure 1.

If the operative characteristics of the thermostatic installation used in a room be first described, the operation of the controlling mechanism in the engine room can be more readily understood.

Figures 1 and 2 considered together serve as a complete diagram of the system, except that it will be understood that the units shown in Figure 2 are duplicated, there being one for each room in the building whose temperature is to be controlled. The air supply line is shown at 11 in both these figures, and leads to supply ports in the thermostat indicated generally by the reference letter T and in the relay indicated generally by the reference letter TR.

The thermostat T will first be described, with reference to Figures 2 and 4 to 8 inclusive.

The pipe 11 leads to a passage 12 which communicates at its lower end with an expansible diaphragm chamber 13. The diaphragm chamber 13 acts against a bearer disk 14 on a triangular yoke 15, which is pivoted at 16 on the body 17 of the thermostat T. The range of motion of this yoke is limited by the head of a stop screw 18, which enters a notch 19 (see Figure 8) formed at the upper end of the pivoted yoke 15.

The yoke 15 is urged inward by spring 20, and this spring is so adjusted that when the pressure on the line 11 is at, or approximately at, the normal value, the yoke 15 will stand at its mid-position. If the pressure on the supply line 11 be raised substantially, the yoke 15 will move outward until arrested by the head of the stop screw 18. Conversely, if the pressure on the line 11 be lowered substantially, the yoke 15 will move inward until arrested by the head of the stop screw 18.

The yoke 15 carries at its upper end a finger 21 which upon movement of the yoke serves to engage two spaced lugs 22 and 23 on a shiftable stop 24, which is pivoted on the body 17 at 25. In its active position shown in Figure 5, the stop 24 is horizontal and serves to hold the night thermostatic bar in inactive position, as will hereinafter be described. In its inactive position the stop 24 is lowered by swinging through an angle of approximately 20° and then clears the night thermostatic bar to permit it to operate.

The stop 24 is retained in its two positions by means of a leaf spring 26 mounted on the body 17 and engaging flats formed on a portion of the stop 24 adjacent the pivot 25 (see Figure 5). This produces an impositive detent of the knife hinge type, so that the stop 24 is retained by the spring 26 alternately in its active and inactive positions.

The normal position of the yoke 15, as stated, is intermediate its two limits of motion, which limits are defined by the stop screw 18. There is just sufficient clearance allowed between the lugs 22 and 23 and the finger 21 to permit the stop member 24 to be in either of its two positions without interference by the finger 21, when the yoke 15 is in its normal or mid-position.

It follows from the above arrangement that if the yoke 15 moves outward from its normal position to the limit of its outward motion, it will set the stop 24 in its active position and will leave it in such active position upon its return to the normal position. Similarly, the movement of the yoke 15 inward from its normal position to the inward limit of its motion will shift the stop to inactive position, where the stop will remain even after the yoke 15 returns to its normal mid-position.

The pressures necessary to produce the desired movements of the yoke 15 depend on the character and adjustment of the spring 20. For the purposes of explanation only, reference will hereafter be made in this specification to the following characteristic pressures which harmonize with present practice in the art. Systems may obviously be constructed to operate at other pressures. The normal pressure on the line is assumed to be 15 pounds per square inch. A pressure of 20 pounds per square inch is assumed to be sufficient to move the yoke 15 to the limit of its outward motion, while this yoke is assumed to move to the limit of its inward motion, when the pressure drops to 10 pounds per square inch.

In the operation of a system so adjusted a pressure of 15 pounds is constantly maintained on the line 11. To set the system for day temperature the pressure is raised for a short period to 20 pounds, and then restored to 15 pounds per square inch. To set the thermostat for night temperature the pressure is reduced to 10 pounds for a short period and then restored to the normal 15 pound value.

On the lower part of the body 17 of the thermostat there are pivoted two independent saddles 27 and 28. The upper ends of these saddles are drawn inward by corresponding coil springs 29 and 30, so that the saddles are arrested and may be adjusted in position by the stop screws 31 and 32. The saddle 27 carries a thermostatic bar 33 which is set to maintain the higher or day temperature, and the saddle 28 carries a thermostatic bar 34 which is set to maintain the lower or night temperature. These two bars are both so contrived that they flex inward, that is, toward the body 17 of the thermostat upon rise of temperature, and it follows that at the same temperature the upper end of the bar 34 will stand closer to the body than does the upper end of the bar 33. To permit the day bar 33 to act, the night bar 34 must be retracted or moved outward. That is the function of the stop member 24 which underlies the bar 34. When the stop 24 is horizontal the bar 34 is held outward in inactive position. It may be permanently retained in this position, regardless of the action of the stop 24 by means of a thrust screw 35, which engages the lower end of the saddle 28, and which carries a pointer 36 to indicate the position of the screw 35. Both the bars 33 and 34 coact with a valve member 37 which is pivoted at 38 on the upper end of the body 17, and which carries a counterweight 39 tending to urge the valve member 37 outward or away from the leak port 40, with which it coacts. The leak port 40 is connected by a passage 41 and pipe 42 with a passage 43 in the body 44 of the relay TR.

The supply pipe 11 previously described communicates with a passage 45 in the body 44 of the relay TR, and this passage leads past a restricting needle valve 46 to the passage 43 already described. The passage 43 is in direct communication with an expansible diaphragm chamber 47 and the needle valve 46 is so adjusted that its capacity is less than that of the leak port 40. Accordingly, when the leak port is open the diaphragm chamber collapses, and when it is closed the diaphragm chamber 47 is distended. In this way the diaphragm chamber 47 actuates a lever 48 which is pivoted at 49 on the body 44 of the relay TR, and whose motion is limited by the head of the stop screw 50 which enters a slot 51 on the lever 48. The passage 45 has a branch which leads to the valve seat 52 in a valve chamber 53. A valve 54 is shiftable in this chamber so as to seat alternatively against the seat 52, and against an opposed seat 55 which controls an exhaust port consisting merely of clearance around the stem 56 of the valve 54. The stem 56 is connected so as to be operated by the lever 48 by means of a quick throw motion of familiar form, comprising a spherical head 57 and a contractile annular spring 58 housed in a slot 59 at the upper end of lever 48. The valve chamber 53 is connected by a pipe 60 with the diaphragm chamber of a diaphragm operated radiator valve. This consists of a housing 61 enclosing a metallic bellows diaphragm 62 which acts directly on the stem 63 of a radiator valve 64. A spring 65 urges the valve open.

It will be observed that the night bar 34 controls the valve 37 unless it be rendered inactive by stop 24 or stop 36. The stop 36 is set to render the thermostat inactive in any room which is to be used in the evening, and is set in the reverse position in any room which is not to be used in the evening. In the first case, day temperature is maintained throughout the twenty-four hours. In the second case, the bar 33 functions to control the temperature when the stop 24 is effective to hold out the bar 34. When it is ineffective the bar 34 acts to control the valve 37. When this valve opens the leak port 40, relay TR is affected as follows; the diaphragm 47 collapses, the upper end of the lever 48 moves outward, the valve 54 shuts off the supply of motive fluid to the radiator diaphragm 62 and opens it to exhaust, thus opening the valve 64 and turning on the heat. When the leak port 40 is closed the valve 54 is moved to the reverse position, admitting pressure against the diaphragm 62 and closing the valve 64.

The adjustment of the stop 24 to establish day temperature is effected by temporary rise of pressure in the pipe 11 above the normal. The adjustment in the reverse direction, which lowers the stop 24 clear of the night bar 34, is effected by a temporary drop of pressure below the normal in the pipe 11. Except for these short periods, the pipe 11 is maintained at all times under normal pressure. The apparatus used in the engine room to effect the respective temporary increases and decreases of pressure will now be described with reference to Figure 1.

66 is a reservoir, to which pressure fluid is supplied, by any known means, in such a way as to maintain a substantially constant pressure in the reservoir 66. The pressure maintained in this reservoir is that required to create the high pressure wave in the supply line, and under the conditions assumed is twenty pounds per square inch or more. The gage 67 indicates the pressure in the reservoir 66. The reservoir 66 feeds a second reservoir 68, through a reducing valve 69, the valve 69 being so adjusted as to maintain in the reservoir 68 the normal pressure under which it is desired to operate the supply line 11. This has been assumed to be 15 pounds per square inch. Gage 68ª indicates the pressure in the reservoir 68.

Between the reservoir 68 and the supply line 11 there is interposed in the order stated a check valve 73 opening toward the line and a three-way valve whose body is shown at 70. This is provided with an inlet seat 71 and an exhaust seat 72. The inlet seat 71 is connected with the reservoir 68. The exhaust seat leads to a throttling cock 74, whose purpose is to limit the rate of venting of the system. The space betwen the seats 71 and 72 is connected directly with the supply line 11. A valve 75 mounted on a stem 76 is arranged to be seated alternately against the seats 71 and 72 by means of a diaphragm motor comprising a housing 77, a metallic bellows diaphragm 78 enclosed therein, and a return spring 79 which urges the valve 75 toward the seat 72.

Under normal operating conditions the valve 75 is in its upward position, shown in Figure 1. There is a connection from the high pressure reservoir 66 to the main supply line 11 controlled by a diaphragm operated stop valve whose body is shown at 80. The body 80 is formed with a single seat 81 against which the valve member 82 seats in an upward direction. The valve is carried on a stem 83 and is normally urged closed by a spring 84 surrounding this stem, but it may be forced open by pressure fluid admitted within the casing 85, so as to act downward upon a metallic bellows diaphragm 86. The normal condition of the valve 82 is closed against the seat 81.

It will be observed, therefore, that normally the reservoir 66 is cut off from the line 11, reservoir 68 is connected thereto, and the exhaust through seat 72 and throttle cock 74 is closed.

Two essentially identical mechanisms are provided to actuate valves 75 and 82. These are distinguished by the letter D, indicating day setting mechanism, and N, indicating night setting mechanism, in Figure 1. The two mechanisms are absolutely identical, and a single description will be given to both, making use of the same reference numerals, except for distinguishing subscripts $d$ and $n$.

The day setting instrument includes a body $88^d$ having a passage $89^d$ fed by a connection 90 from the low pressure reservoir 68. This connection 90 is entirely distinct from the main line 11. The port $89^d$ leads past a needle valve $91^d$ to a port $92^d$ which is connected with an expansible diaphragm chamber $93^d$. The diaphragm chamber $93^d$ acts against the bearer plate $94^d$ on a yoke $95^d$, pivoted at $96^d$ on the body $88^d$. The yoke $95^d$ is limited in motion by a stop screw $97^d$ whose head projects into a slot $98^d$ in the yoke $95^d$.

The yoke $95^d$ may be moved inward toward the body $89^d$ by a push button plunger $99^d$, which engages the bearer plate $94^d$, when pressed inward manually, and which is normally held retracted by a coil spring $100^d$. The plunger $99^d$ and the spring $100^d$ are mounted in and supported in any suitable manner, for example, by a casing structure, a portion of which is indicated in 101.

Formed in the body $89^d$ is a valve chamber $102^d$ formed on two opposed valve seats $103^d$ and $104^d$. A valve $105^d$ is arranged to seat alternately against the seats $103^d$ and $104^d$. When it seats against $103^d$ it closes a branch of the supply port $89^d$. When it seats against $104^d$ it closes an exhaust port which is in the form of clearance around the stem $106^d$ of the valve $105^d$. This stem is connected to be actuated by the yoke $95^d$ through a quick throw mechanism consisting a spherical head $107^d$ and a contractile annular spring $108^d$ housed in a slot $109^d$, formed in the upper end of the yoke $95^d$. In the case of the instrument D the port $110^d$ is connected by a pipe 111 with a space above the diaphragm 86, and in the case of the instrument N the port $110^n$ is connected by the pipe 112 with a space above the diaphragm 78. Passage $92^d$ of the instrument D is connected by a pipe 113 with a high limit leak port 114 mounted within the case of the pressure gage 115. The passage $92^n$ of the instrument N is connected by a pipe 116 with a low limit leak port 117 also mounted within the gage 115. The hand 118 of the gage 115 is provided with two valve units, one of which, 119 is adapted to seat against the high limit leak port 114, at the high reading of the gage. This limit is assumed to be 20 pounds, the highest pressure used in the system. The second valve element carried by the hand 118 is shown at 120 and acts to seal the leak port 117 when the pressure in the system is at 10 pounds.

The gage 115 is connected by the pipe 121 with the main supply line 11. It hence responds to the pressure in the supply line.

Assuming that the system is set to maintain the night temperature it may be adjusted to maintain day temperature by pressing the button $99^d$ of the instrument D. This moves the yoke $95^d$ of that instrument inward. Since the system is then under normal pressure of 15 pounds, the leak port 114 is open and the diaphragm $93^d$ is deflated. The yoke $95^d$ therefore remains in its inward position, with the valve $105^d$ against the exhaust seat $104^d$. This admits pressure to the pipe 111 to act against the diaphragm 86. Consequently, the valve 82 opens and establishes the higher pressure, assumed to be 20 pounds, on the line 11. The gage 115 responds to the increase in pressure, and by sealing the leak port 114 causes pressure to build up in the diaphragm chamber $93^d$, thus restoring the yoke $95^d$ to its outward position, venting the space above the diaphragm 86, so that the valve 82 closes. The excess pressure in the line 11 then bleeds away gradually through the leak ports 40 of the various thermostatic instruments, and when the pressure has fallen to normal (15 pounds) the reservoir 68 continues to feed the line. When day temperature is in effect, night temperature can be established by pressing the push button $99^n$ of the instrument N. This shifts the valve $105^n$ so as to admit pressure to the space above the bellows diaphragm 78. This closes the valve 75 against the seat 71 and connects the main supply line 11 with the atmosphere through the throttling cock 74. The cock 74 is set so that the pressure will drop substantially uniformly throughout the length of the supply line 11. This is necessary in order that the gage 115 will not give the low reading before the most distant thermostat has been affected by the drop in pressure. When the hand 118 of the gage 115 does reach the low reading the valve member 120 will close the leak port 117, causing pressure to build up in the diaphragm $93^n$. This shifts the yoke $95^n$ and restores the valve $105^n$ to its normal position, which once again vents the space above the diaphragm 78 and allows the valve 75 to return to normal position, in which it closes the atmospheric vent and connects the reservoir 68 with the main supply line 11.

In order to indicate in the engine room the condition of the system, use is made of a pressure actuated indicator. This is controlled by a unit which has the same adjustment characteristics as the thermostatic unit T. Mechanically, it is substantially identical with the thermostat except that a thermally neutral element is substituted for the thermostatic bar and a few minor ports not necessary to the indicating functions are omitted. It operates in conjunction with a relay identical with the relay TR. In Figure 1 the indicator control instrument is designated generally by the letter I and its connected relay by the letter IR. Parts of the instrument I and R which are identical with corresponding parts of the thermostat T and relay TR are given the same reference numerals with the subscript a.

No detail description is necessary beyond pointing out the differences, which are:

The member 122 of the instrument I which takes the place of the thermostatic bar 34 of the instrument T, is thermally neutral instead of being a thermostatic bar. There are no elements in the instrument I corresponding to the parts numbered 27, 29, 31, 33, 35 and 36 of the instrument T. The purpose of the instrument I is merely to indicate whether the night bar 34 of the various thermostats is in its operative or inoperative position. Hence in the indicating instrument there is no occasion for anything corresponding to the day bar 33 and its related parts, nor is there any occasion for the selective hold out screw used on the night bar of the thermostats. Hence these parts are bodily omitted. The instrument I can be, and usually is, merely a modified thermostat in which the day bar elements are omitted and a neutral bar is substituted for the night bar.

It will be observed that the bar 122 of instrument I is moved outward and inward by the stop member 24ª of the instrument I and opens and closes the leak port 40ª of this instrument.

The relay IR is connected to the indicating instrument I just as the relay TR is connected to the thermostat T. The valve chamber 53ª of the relay IR is connected by a pipe 123 with a pressure gage 124, which has the legend "Day" at the zero pressure indication of the hand 125, and the legend "Night" at the high pressure indication of this hand. In day setting the stop 24ª of the instrument I retracts the bar 122, allowing the valve 37ª of the instrument I to open the corresponding leak port 40ª. The relay IR then functions to vent pressure from the pressure gage 124, so that the hand 125 moves to its zero reading indicated by the legend "Day." When the system is set for night, the stop 24ª clears the bar 122, and the valve 37ª closes the leak port 40ª of the instrument I. This operates the relay IR, whose supply port is connected to the branch line 90 so as to admit pressure fluid from the reservoir 68 to the gage 124. Consequently, under these conditions the hand 125 points to the legend "Night" on the dial of the gage 124.

The operation of the system has been traced as the description proceeded, and need not be repeated.

It will be observed that in the event of failure to shift the stop 24ª of any thermostat T upon the operation of the button 99ᵈ or 99ⁿ of either of the instruments D or N, the thermostat adjustor thus failing to function is not put permanently out of phase with the rest of the system, but may function normally upon the next adjusting actuation.

While the actuating mechanism and the indicating mechanism shown in Figure 1 are preferred, it is possible to omit the indicating mechanism altogether or substitute other equivalent mechanisms for it, and it is possible to substitute functionally equivalent mechanisms for the actuating mechanism of Figure 1. Various other changes of detail may be made without departing from the spirit of the invention.

The control instrument D and the related mechanism including the diaphragm operated three-way valve 82 and the gage 115 with its leak port 114 is not the sole invention of the present applicant, and hence is not claimed herein, but is made the subject matter of a copending joint application.

What is claimed is:—

1. The combination of a pressure fluid thermostat having a pressure fluid supply line arranged to operate at a definite normal pressure; shiftable adjusting means for adjusting said thermostat to vary the temperature maintained thereby; a motor subject to supply line pressure and so related to said adjusting means that a surge of increased pressure and a surge of decreased pressure in the pressure line act through the motor to shift said adjusting means in respectively opposite directions; means for maintaining normal pressure in the supply line; and means for producing selectively and at will pressure surges above and below said normal pressure.

2. The combination of a pressure fluid thermostat having a pressure fluid supply line arranged to operate at a definite normal pressure, and having two thermostatic control elements, arranged to be rendered operative and inoperative alternately with each other; a control member movable to produce such alternation of said thermostatic elements; a motor subject to supply line pressure and so related to said control member that a surge of increased pressure and a surge of decreased pressure in the pressure line act through the motor to shift said controlling member in respectively opposite directions; means for maintaining normal pressure in the supply line; and means for producing selectively and at will pressure surges above and below said normal pressure.

3. The combination of a pressure fluid thermostat having a pressure fluid supply line arranged to operate at a normal pressure and having temperature responsive means controlling the application of such pressure fluid to effect temperature control, said responsive means being capable of adjustment to maintain either of two different temperatures; a controller shiftable alternately to two different positions, and arranged to adjust said responsive means alternately to maintain said two temperatures; a motor subject to supply line pressure and having a lost motion connection with said controller for moving the controller in reverse directions respectively upon the occurrence of pressure surges in said supply line above normal pressure and below normal pressure; means for establishing normal pressure in the supply line; and means for maintaining in said supply line selectively and at will pressure surges above and below said normal pressure.

4. The combination of a pressure fluid thermostat having a pressure fluid supply line arranged to operate at a normal pressure and two temperature responsive means arranged to control in alternation with each other the application of such pressure fluid to effect temperature control; a controller shiftable alternately to two different positions, in each of which a corresponding one of the two thermostatic elements is rendered operative to the exclusion of the other; a motor subject to supply line pressure and having lost motion connection with said controller for moving the controller in reverse directions respectively upon the occurrence of pressure surges in said supply line above normal pressure and below normal pressure; means for maintaining normal pressure in the supply line; and means for generating in said supply line selectively and at will pressure surges above and below said normal pressure.

5. The combination of a pressure fluid thermostat having a pressure fluid supply line arranged to operate at a normal pressure, and having two thermostatic bars, each capable of controlling the application of such pressure fluid to effect temperature control, one of said thermostatic bars responding to temperature in advance of the other; a controller shiftable alternately to different positions, in one of which it permits the advanced one of said bars to function and in the other of which it prevents said bar from functioning; a motor subject to supply line pressure and having a lost motion connection with said controller for moving the controller in reverse directions upon the occurrence of pressure surges in said supply line, respectively above normal pressure and below normal pressure; means for maintaining normal pressure in the supply line; and means for generating in said supply line selectively and at will pressure surges above and below said normal pressure.

6. The combination of a pressure fluid thermostat having a pressure fluid supply line arranged to operate at a normal pressure; a pair of thermostatic bars each capable of controlling the application of said pressure fluid to effect temperature control, one of said thermostatic bars responding to temperature in advance of the other; a stop shiftable alternately between two positions, in one of which the stop renders the advanced thermostatic bar inoperative, and in the other of which it permits it to function; an impositive detent serving to retain said stop alternatively in its two positions; a motor subject to supply line pressure and having a lost motion connection with said controller adapted to permit the motor to return to normal position after effecting adjustment of said stop in either direction, without changing the adjustment of the stop; means for establishing normal pressure in the supply line; and means for generating in said supply line selectively and at low pressure surges above and below said normal pressure.

7. The combination with a temperature control system including a pressure fluid supply line arranged to operate at a definite normal pressure, and one or more pressure fluid control thermostats connected with said line and each including means for changing its adjustment in one direction operable by a wave of abnormally high pressure in said supply line, and means for changing its adjustment in the opposite direction by a wave of abnormally low pressure; of means for maintaining normal pressure on said line; independent valve means, one operable to initiate an increase of pressure in said line, and the other operable to initiate a decrease of pressure in said line; and automatic means responsive to the resulting changes of pressure and serving to restore normal pressure in said line.

8. The combination with a temperature control system including a pressure fluid supply line arranged to operate at a definite normal pressure, and one or more pressure fluid control thermostats connected with said line and each including means for changing its adjustment in one direction operable by a wave of abnormally high pressure in said supply line, and means for changing its adjustment in the opposite direction by a wave of abnormally low pressure in said supply line; of a source of normal pressure fluid for said line; a pressure controlling valve interposed between said source and said line, and serving in normal position to connect the same and in abnormal position to interrupt such connection and vent the line; a source of higher pressure; a high pressure controlling valve interposed between said second source and said line and serving in normal position to disconnect the same and in abnormal position to connect the same; independent motors for actuating said valves; independent admission and exhaust valves for controlling said motors; independent control members having normal and abnormal positions; quick throw connections between each control member and the corresponding admission and exhaust valve, the parts being so arranged that in the abnormal position of each control member the corresponding valve-actuating motor is moved to abnormal position; independent restoring motors one for each control member, and each operable to shift said control member to normal position; and means subject to line pressure and rendered operative by the decrease of line pressure from normal to put the first restoring motor into action, and by an increase of line pressure from normal to put the second restoring motor into action.

In testimony whereof I have signed my name to this specification.

ARTHUR J. OTTO.